July 2, 1935. H. CASLER ET AL 2,006,788
APPLIANCE FOR TESTING VEHICLE WHEELS
Filed Oct. 11, 1928 2 Sheets-Sheet 1
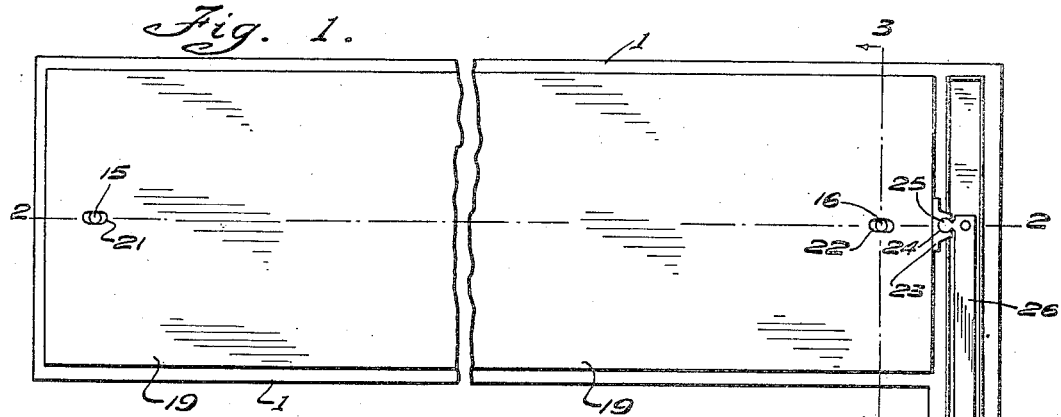
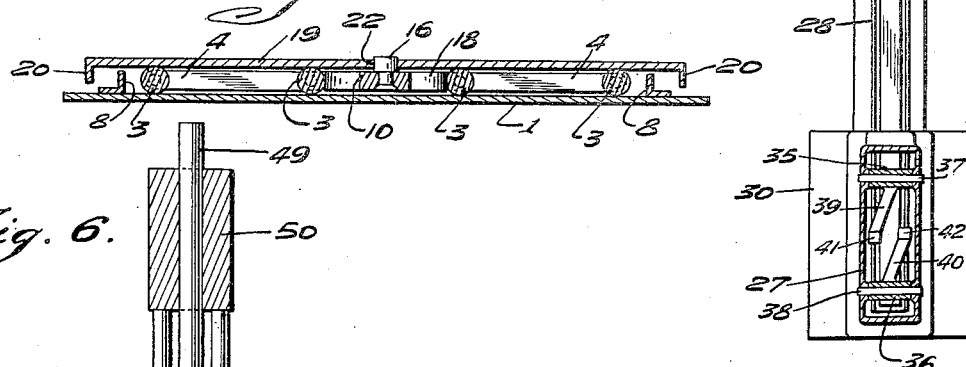
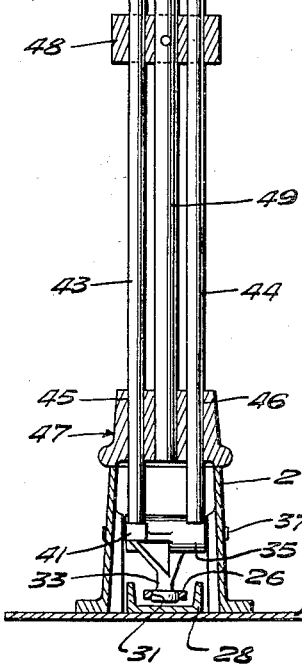
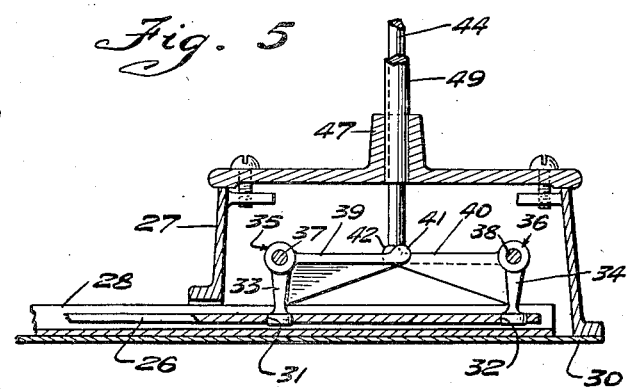
Inventors
Herman Casler
and
Charles P. Grimes
By Percy H. Moore
Attorney July 2, 1935.  H. CASLER ET AL  2,006,788
APPLIANCE FOR TESTING VEHICLE WHEELS
Filed Oct. 11, 1928  2 Sheets-Sheet 2
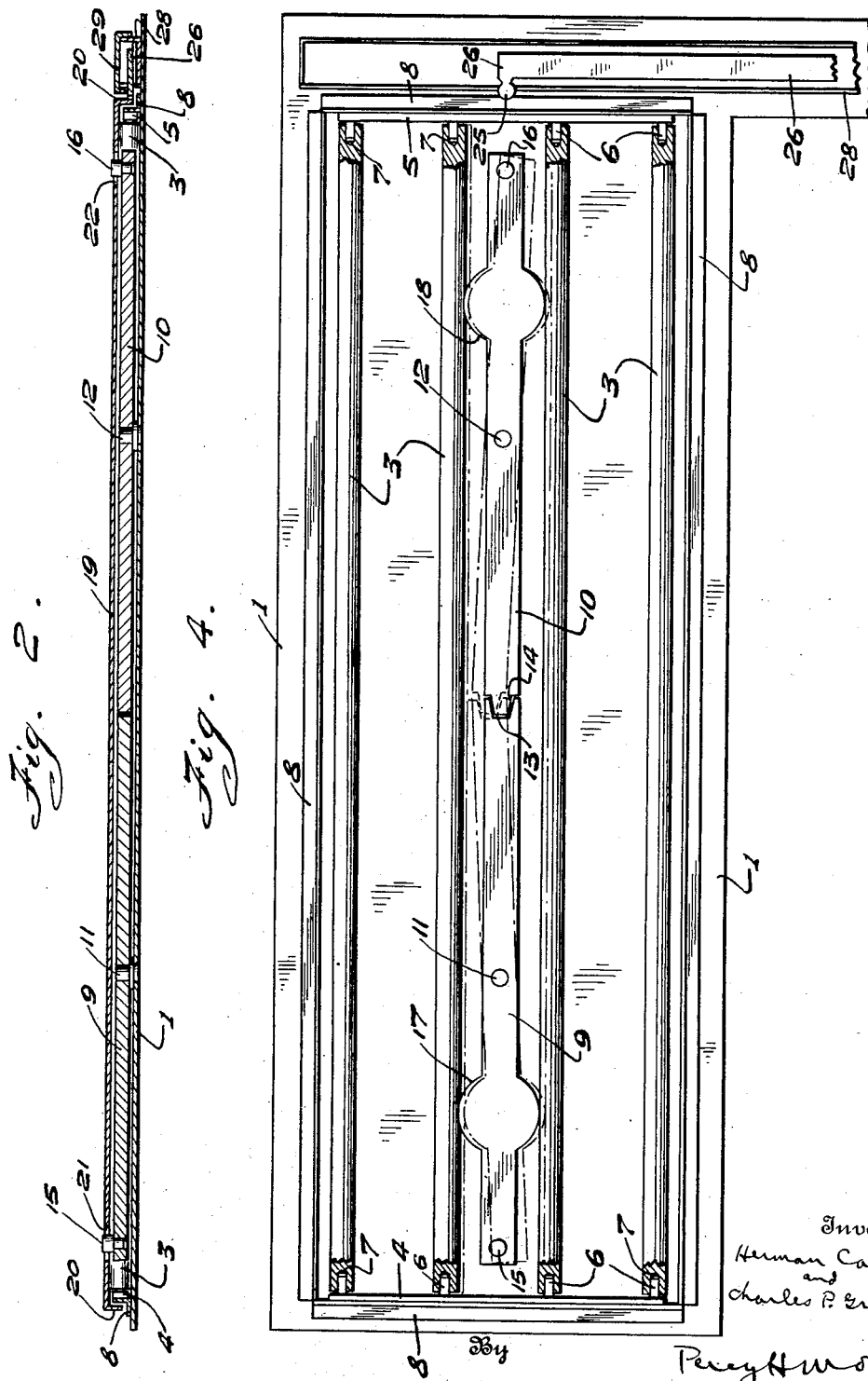

Patented July 2, 1935

2,006,788

UNITED STATES PATENT OFFICE 2,006,788

APPLIANCE FOR TESTING VEHICLE WHEELS

Herman Casler, Canastota, and Charles P. Grimes, Syracuse, N. Y.

Application October 11, 1928, Serial No. 311,888

10 Claims. (Cl. 33—203)

Our invention relates to appliances for testing vehicle wheels adapted for use in determining whether or not the wheels of a vehicle are out of angular alinement with respect to the path of travel of the wheels.

The principal object of the invention is to provide a simply constructed device of the character described, in which the various parts will move with certainty and accuracy to and from their respective positions.

Other and further objects of the invention will be apparent during the course of the following description taken in connection with the accompanying drawings, in which:

Figure 1 is a plan view of the movable platform and mechanism for returning the movable platform to its normal mid position;

Figure 2 is a section on the line 2—2 of Figure 1;

Figure 3 is a section on the line 3—3 of Figure 1;

Figure 4 is a plan view of the mechanism for supporting the movable plate, the movable plate being removed; and Figures 5 and 6 are sectional elevations of the mechanism for returning the movable plate to its normal midway position.

Referring more particularly to the drawings wherein like reference numerals refer to corresponding parts throughout the several views 1 denotes an elongated base-plate, preferably of rectangular shape, adapted to be mounted upon or flush with the floor (not shown) of a garage or other suitable building. The plate 1 supports a plurality of longitudinally disposed spaced anti-friction rollers 3, preferably four in number. These rollers are connected together in spaced relation at their ends by means of spacing bars 4 and 5 provided with trunnions 6 seating within the recesses 7 formed in the ends of the rollers. Angle iron flanges 8 formed on the ends of the base-plate prevent accumulation of dirt under the rollers.

A pair of normally alined abutting levers 9 and 10 are pivotally mounted intermediate their ends upon studs 11 and 12 fixed to and projecting upwardly from the base-plate 1. The lever 9 is formed at its inner end with a gear tooth space 13 which receives a gear tooth 14 formed on the inner end of the lever 10. The outer ends of the respective levers are provided with studs 15 and 16 for a purpose about to be described. It will be noted that the levers 9 and 10 are formed with enlargements 17 and 18 respectively which fit snugly between the centermost anti-friction rollers 3 and serve to maintain the rollers in proper relation to the base-plate 1 and to an elongated movable plate 19. This plate 19 which overlies the base plate 1 and rests upon the rollers 3 is formed with downwardly turned end flanges 20 which lie adjacent to and outside the flanges 8 on the base plate. The studs 15 and 16, previously mentioned project upwardly from the levers 9 and 10 into elongated slots 21 and 22 respectively formed in the outer ends of the movable plate 19.

From the foregoing it will be seen that when the wheel of a vehicle is driven over the movable plate 19 in a longitudinal direction and brought to rest at the far end of the plate, the scrubbing action of the tire, provided the wheel is out of alinement will have caused the movable plate together with the anti-friction supporting rollers 3, to be moved, or shifted either to the right or to the left depending upon whether the wheel toes in or toes out. If there is any appreciable movement of the plate the operator after readjustment of the misalined wheel preferably repeats the test to assure that the defect has been completely corrected.

It should be noted that the distance from stud 11 to stud 15 is twice the distance from stud 15 to the center of the enlargement 17 of the lever 9 and that the same proportions apply to similar parts of lever 10. Also that the displacement or movement of the anti-friction rollers which support the movable plate upon the base plate will be one half the displacement or movement of the movable plate, when the latter is caused to move to the right or left by the action of a misalined vehicle wheel. It therefore follows, by virtue of the stud connections 15 and 16 between the levers 9 and 10 and the movable plate, that the center of the enlargements 17 and 18 will move one-half the distance traveled by the movable plate and as these enlargements just fill the space between two adjacent rollers, the rollers will at all times retain their proper relative position or relationship with respect to the base plate 1 and movable plate 19, when the latter is shifted in the manner heretofore explained. Furthermore, parallel lateral movement of the plate 19 with reference to the base plate is assured. In other words, a force exerted transversely against any part of the plate 19, will act to carry the latter bodily across the base plate 1 by means of levers 9 and 10 and their gear teeth connections 13 and 14 and stud connections 15—16 and 11—12. The return movement of the movable plate and associated mechanism to normal mid-position illustrated in Figure 3, is effected in a manner about to be described.

Secured to one end of the movable plate 19 is a bracket 23 formed with a socket or recess 24 which pivotally receives a knob 25 formed on the inner end of a connecting rod 26, the outer end of which extends into the housing 27 mounted on a base plate 30 and which contains the return mechanism for plate 19. A channel iron or trough 28 leads from the base plate to the housing 27 and serves as a protective enclosure for the return mechanism connecting rod, a cover 29 serving to prevent dirt from accumulating in the channel and interfering with the movement of the rod.

The outer end of the connecting rod 26 is provided with openings 31 and 32 adapted to receive the ball-shaped ends of normally vertically disposed arms 33 and 34 of bell cranks 35 and 36 in turn pivotally mounted upon pivot pins 37 and 38. The other arms 39 and 40 of the bell cranks 35 and 36 are normally disposed in a horizontal plane and are provided at their free ends with enlarged portions 41 and 42. These enlarged portions serve as seats or rests for the lower ends of push rods 43 and 44 slidably mounted in the respective guides 45 and 46 formed in the cover plate 47, the upper ends of the rods passing through a guide member 48, supported in any suitable manner, not shown. A guide rod 49, interposed between the push rods 43 and 44 is fixedly mounted at its lower end in the cover plate 47 and extends at its upper end through the guide member 48. Slidably mounted upon the upper end of this guide rod and resting upon the upper ends of the push rods 43 and 44 is a weight 50.

From the foregoing it will be noted that movement of the movable plate 19 to the right will cause the push rod 43 to be elevated by the arm 39 of the bell crank 35, also that movement of the plate 19 to the left under the action of a vehicle wheel will cause the arm 40 of bell crank 36 to elevate the push rod 44. As upward movement of either rod 43 or 44 is communicated to the weight 50, it follows that when the vehicle wheel being tested is run off the platform, the weight 50, which always rests upon or is supported by one or both push rods 43 and 44, will automatically return the bell cranks 35 and 36 to Figure 5 position. These bell cranks, through connecting rod 26 will in turn bring the movable plate 19 back to its midway or normal position free to once more be moved in either direction. During this return movement the movable plate will be maintained in the same parallel position with respect to the base plate and the same relationship to the rollers with regard to the base plate and the movable plate will be maintained as during the initial movement of the movable plate.

What we claim as our invention is:

1. A vehicle wheel testing device adapted to be placed in the path of travel of the vehicle wheel, comprising a base, a plurality of anti-friction rollers in said base means for maintaining said rollers in fixed spaced relationship with respect to one another, an elongated movable plate mounted on said rollers, a pair of interlocking levers pivoted to the base and operatively connected with said rollers, and means connecting the movable plate with the levers whereby said movable plate will be limited to lateral movement and said rollers will be held in coordinate position with respect to said movable plate, a connecting rod connected at one end to the movable plate, and a pair of counteracting weight actuated crank arms engaging the other end of said lever for restoring said levers, rollers and movable plate to original normal position.

2. A vehicle wheel testing device adapted to be placed in the path of the vehicle wheel comprising a base, an elongated laterally movable member and anti-friction roller support therefor mounted in said base, means whereby movement of said movable member is communicated to said rollers, and the movement of the movable member and the rollers is coordinated in definite ratio, a connecting rod connected at one end to the movable plate, and a pair of counteracting weight actuated crank arms connected to the other end of said connecting rod for returning said movable member and said rollers to normal mid-position.

3. A vehicle wheel testing device comprising a movable element adapted to be placed in the path of travel of the vehicle wheel, and laterally shiftable to right or left of its normal mid-position with reference to said path by the action of a misalined vehicle wheel passing thereover, a connecting rod connected at one end to the movable element, and a pair of counteracting weight actuated crank arms engaging the other end of said lever for restoring said movable element to normal position.

4. A vehicle wheel testing device adapted to be placed in the path of travel of the vehicle wheel comprising a base, a plurality of anti-friction bearings in said base, means for maintaining said bearings in fixed spaced relationship with respect to one another, a movable plate mounted on said anti-friction bearings, coordinating means interlocking with said anti-friction bearings, and connected with said base and said movable plate whereby said movable plate will be limited to parallel lateral movement only with respect to said base and said anti-friction bearings and said anti-friction bearings will be positioned for free rolling contact with said movable plate and said base.

5. In a vehicle-wheel alignment indicator, the combination of a base-plate, an elongated top plate over said base-plate and on which the wheel to be tested is adapted to roll, anti-friction bearing means between said plates and on which said top plate is adapted to travel sidewise, means including rocking-arms connected to said top plate and anti-friction bearing means to compel the latter to travel sidewise one-half the corresponding movement of said top plate and with all positions of said bearing means parallel to one another, and means to indicate the extent of lateral travel of said top plate.

6. In a vehicle-wheel alignment indicator, the combination of a base-plate, an elongated top plate over said base-plate and on which the vehicle-wheel to be tested is adapted to roll, anti-friction bearing means between said plates and on which said top plate is designed to travel sidewise, means including rocking-arms connected to said top plate and to said bearing means to compel all sidewise movement positions of said top plate to be parallel to one another and to compel said bearing means to travel sidewise one-half the travel of said top plate and with all of its positions parallel to one another, and means to indicate the extent of lateral travel of said top plate.

7. In a vehicle-wheel alignment indicator, the combination of a base-plate, an elongated top plate over said base-plate and on which the vehicle-wheel to be tested is adapted to roll, anti-friction bearing means between said plates and on which said top plate is designed to travel sidewise, two levers fulcrumed on said base-plate and arranged end to end with their adjacent ends rockingly connected together, said connected ends being equally distant from the two fulcrums, means connecting said top plate to said two levers at points equally distant from the corresponding fulcrums, whereby all sidewise movement positions of said top plate are parallel to one another, and means to indicate the extent of lateral travel of said top plate.

8. In a vehicle-wheel alignment indicator, the combination of a base-plate, an elongated top plate over said base-plate and on which the vehicle-wheel to be tested is adapted to roll, anti-friction bearing means between said plates and on which said top plate is designed to travel sidewise, two levers fulcrumed on said base-plate and arranged end to end with their adjacent ends rockingly connected together, said connected ends being equally distant from the two fulcrums, means connecting said top plate to said two levers at points equally distant from the corresponding fulcrums, whereby all sidewise travel positions of said top plate are parallel to one another, means connecting each of said levers at equal distances from their respective fulcrums to said anti-friction bearing means to effect positive travel of the latter laterally of said base-plate upon sidewise movement of said top plate, and means to indicate the extent of the lateral travel of said top plate.

9. In a vehicle-wheel alignment indicator, the combination of a base-plate, an elongated top plate over said base-plate and on which the vehicle-wheel to be tested is adapted to roll, anti-friction bearing means between said plates and on which said top plate is designed to travel sidewise, two levers fulcrumed on said base-plate and arranged end to end with their adjacent ends rockingly connected together, said connected ends being equally distant from the two fulcrums, means connecting said top plate to said two levers at points equally distant from the corresponding fulcrums, means connecting said levers to said anti-friction bearing means at points half-way between their fulcrums and their connections to said top plate, whereby all sidewise movement positions of said top plate are parallel to one another and all sidewise travel positions of said bearing means laterally of the base-plate are parallel to one another and the amount of travel of said bearing means is one-half that of said top plate, and means to indicate the extent of lateral travel of said top plate.

10. In a vehicle-wheel alignment indicator, the combination of a base-plate, an elongated top plate over said base-plate and on which the vehicle-wheel to be tested is adapted to roll lengthwise of the plate, an anti-friction bearing construction between said plates and on which said top plate is adapted to travel sidewise, said construction including rollers disposed lengthwise the length of such top plate and of nearly the length of such top plate, means including rocking-arms fulcrumed on said base-plate and connected to said top plate and to said anti-friction bearing construction to compel all sidewise movement positions of the top plate to be parallel to one another and to compel said anti-friction bearing construction to travel sidewise in like manner but with one-half of the travel of said top plate, and means to indicate the extent of lateral travel of said top plate.

HERMAN CASLER.
CHARLES P. GRIMES.